B. F. Sturtevant,

Blank for Shoe Pegs,

No. 2,286, Reissued June 12, 1866.

Witnesses.
John H. Field
N. B. Chamberlin.

Inventor.
B. F. Sturtevant

UNITED STATES PATENT OFFICE.

BENJAMIN F. STURTEVANT, OF BOSTON, MASSACHUSETTS.

IMPROVEMENT IN BLANKS FOR SHOE-PEGS.

Specification forming part of Letters Patent No. 25,149, dated August 16, 1859; Reissue No. 2,286, dated June 12, 1866.

*To all whom it may concern:*

Be it known that I, BENJAMIN F. STURTEVANT, of Boston, in the county of Suffolk and State of Massachusetts, have invented a new and useful article of manufacture, being a ribbon formed suitable for being split or cut into shoe-pegs; and I do hereby declare that the following, taken in connection with the drawings, is a full, clear, and exact description thereof.

Figure 1:
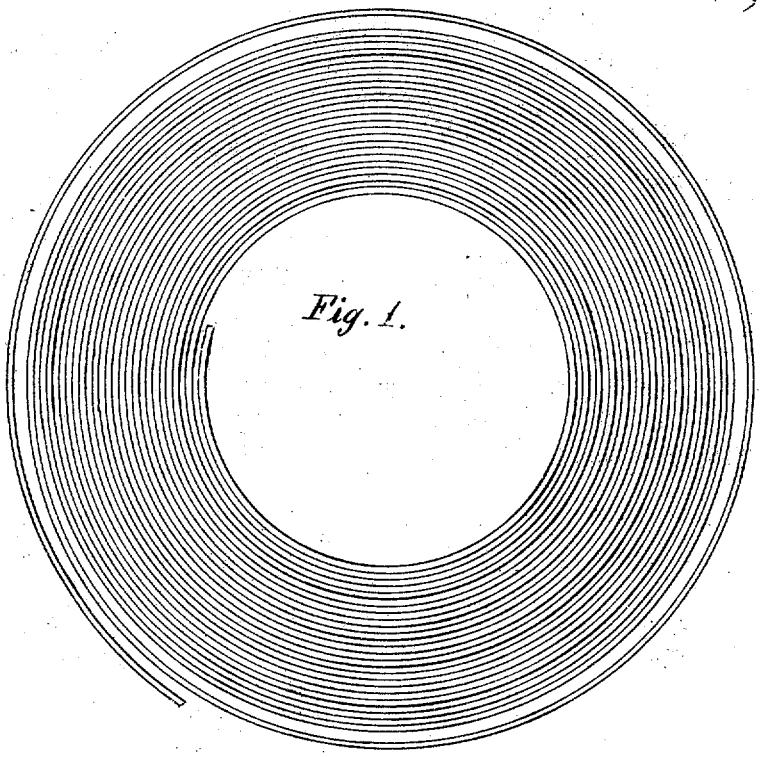
Figure 2:
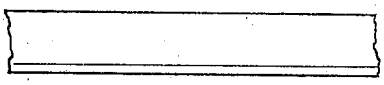
Figure 3:
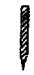

In the drawing, Figure 1 is a plan of the new article of manufacture, exhibiting a long coil or ribbon of wood. Fig. 2 is a side elevation of the same; and Fig. 3 is a section through the same.

Prior to the date of my invention machines for pegging shoes came into actual use, and it was a desideratum to discover for employment in them a better peg-blank than had been hitherto manufactured. These blanks, both for hand and machine use, had, prior to my invention, been made by splitting or sawing strips of the thickness of the length of a peg and as wide as a peg from a slab of wood cut across the grain of a log. When these strips were split they had not that uniformity of size desirable for use in a pegging-machine; when sawed there was a waste of material, and in both instances the strips were being limited in length by the diameter of the log, being too short for profitable use and too expensive.

After some consideration and experiment I discovered a means of making shoe-peg blanks by which I was enabled to make my new article of manufacture. This machinery consists of an ordinary lathe with a slide-rest having a feed motion which will carry it regularly toward the axis of the lathe-spindle or across the ways of the lathe. On the rest is secured a knife with one side of the edge beveled, and with the beveled side farthest from the axis of the spindle, and with the edge parallel to that axis. There is also secured to the rest a guard which bears upon any wood that may be in the lathe in advance of the knife-edge, and also makes pressure upon the wood that has been cut by the knife griping it. A knife or knives so arranged as to cut into the wood between the guard and the knife in planes perpendicular to the lathe-spindle axis, and also attached to the rest, and these knives score the log before the first-described knife cuts it, and if more than one be used they are set apart from each other at distances equal to the length of a shoe-peg. By the use of these means a spiral of wood can be cut off a log of wood, previously turned cylindrical, of the width of the length of a shoe-peg, as thick as the thickness of a peg, and of a length depending upon the diameter of the log and the thickness of the scroll or spiral. Such strips are uniform throughout in width and thickness, and I have made them from fifty to sixty feet in length. After the strips are thus cut they are to be so shaped on one edge that when split the pegs produced will be pointed. I prefer to shape the edge by means of knives in circular cutters, similar in construction and use to those used in molding or stave-jointing machines, to shape the edge, as shown in the drawing; but the precise configuration of the edge from which the point is to be formed is immaterial, so long as it is of such character that the pegs when split from it are pointed sufficiently for the purpose of driving them into soles.

This is the way in which I prefer to make these peg-blanks; and in order to have these distinguishing characteristics they must be cut with their length in the direction of the spiral or scroll around the center of the log, or nearly so, and their distinguishing characteristics, when finished, are, first, that they are as wide as the length of a peg; second, that they are as thick as the thickness of a peg; third, that they are on one edge so shaped, substantially as shown in the drawings, as to fit pegs split from them for being driven by the action of some proper instrumentality; fourth, that they are so shaped on the other edge, substantially as represented in the drawings, that pegs split from them shall be properly pointed, so as to be fit for driving into soles; fifth, that the strip or scroll in the direction of its length is composed of fibers of wood that originally run round the log continuously, substantially in the direction of a spiral or scroll, and that lines drawn perpendicularly across the strip or finished manufactured articles will cross the fibers in the direction of radii extending from the center of the log from which the strips are cut, or substantially so.

I do not think it necessary to enlarge upon the utility of the article of manufacture herein described, to show manufacturers or peg-blank makers, to whom this specification is chiefly addressed, nor to describe more fully my preferred process of manufacture to veneer-cutters, who can easily make the article by the aid of the foregoing description.

I claim as my invention—

The new article of manufacture herein described, which is a peg-blank having essential characteristics, substantially such as herein set forth.

B. F. STURTEVANT.

Witnesses:
N. B. CHAMBERLIN,
JOHN H. FIELD.